United States Patent [19]  
Ginn

[11] 3,848,881  
[45] Nov. 19, 1974

[54] HIGH PRESSURE SEAL
[75] Inventor: Arthur H. Ginn, Laconia, N.H.
[73] Assignee: International Packings Corporation, Bristol, N.H.
[22] Filed: Oct. 3, 1973
[21] Appl. No.: 402,979

[52] U.S. Cl. ............................... 277/181, 277/235
[51] Int. Cl. ............................................. F16j 15/32
[58] Field of Search ............ 277/153, 179, 181–186, 277/188, 198, 235 R

[56] References Cited
UNITED STATES PATENTS

| | | | |
|---|---|---|---|
| 2,487,669 | 11/1949 | Pattullo et al. | 277/181 |
| 2,542,141 | 2/1951 | Horton | 277/184 |
| 2,755,113 | 7/1956 | Baumheckel | 277/179 |
| 2,797,944 | 7/1957 | Riesing | 277/179 |
| 2,873,153 | 2/1959 | Haynie | 277/235 |
| 3,117,796 | 1/1964 | Liebig | 277/179 |
| 3,123,367 | 3/1964 | Brummer et al. | 277/179 |
| 3,495,843 | 2/1970 | Andersen et al. | 277/183 |

Primary Examiner—Harry N. Haroian  
Assistant Examiner—Robert I. Smith

[57] ABSTRACT

A radial seal for shaft-to-bore sealing comprising an integral annular elastomeric body, a first rigid reinforcing member enclosed by the elastomeric body and comprising a generally axial first portion and a second portion projecting radially inwardly from the first portion, and a second rigid reinforcing member partially enclosed by the elastomeric body and including an annular surface facing the first reinforcing member. The second portion of the first reinforcing member contacts that surface of the second reinforcing member at a plurality of spaced apart locations, providing spaces through which the elastomeric body extends.

3 Claims, 6 Drawing Figures

PATENTED NOV 19 1974  3,848,881

HIGH PRESSURE SEAL

BACKGROUND OF THE INVENTION

The present invention relates to a seal for shaft-to-bore sealing against a high pressure fluid medium and, more particularly, to such seals which include elastomeric portions and rigid reinforcers.

In the design of such seals, a number of requirements must be simultaneously met. Thus, not only must there be leak-proof sealing engagement between the seal and both the shaft and the bore, but there must also be adequate pressure resistance to prevent the seal from moving bodily axially under the high pressure exerted by the fluid medium. Occasionally, an annular washer may be provided which is secured to, or integral with, the member in which the bore is provided and which extends radially into the annular gap between the bore and the shaft. This flange can serve as a support to maintain the seal in its proper location despite the pressure exerted by the fluid medium. In many circumstances, however, it is undesirable or impossible to provide such a support washer.

SUMMARY OF THE INVENTION

In view of the foregoing discussion, it is a principal object of the present invention to provide a seal for shaft-to-bore sealing which, in addition to providing a leak-proof seal against both the shaft and the bore, is resistant to the pressure exerted by a fluid medium even in the absence of a separate support for preventing axial movement of the seal.

In accordance with the invention, a radial seal for shaft-to-bore sealing against a high pressure fluid medium comprises an integral annular elastomeric body having a maximum radial dimension at least as great as the shaft-to-bore gap. A first rigid reinforcing member is at least partially enclosed by the elastomeric body and comprises a generally axial first portion and an integral second portion projecting radially inwardly from the first portion. A second rigid reinforcing member is at least partially enclosed by the elastomeric body and includes an annular surface facing the first reinforcing member second portion, and contacting that portion at a plurality of spaced apart locations, providing spaces through which the elastomeric body extends so that it may be integrally molded. In preferred embodiments those locations are symmetrically disposed upon a reference circle about that surface of the second rigid reinforcing member; the first portion of the first reinforcing member is cylindrical; the second portion is integral therewith at one end of the first portion and that surface of the second member is disposed in a radial plane having discrete, arcuately spaced projections thereon for spacing apart the two members.

BRIEF DESCRIPTION OF THE DRAWING

Other objects, features, and advantages of the invention will appear from the following description of a particular preferred embodiment which is illustrated in the accompanying drawing. In the drawing.

DETAILED DESCRIPTION OF A PARTICULAR PREFERRED EMBODIMENT

Figure 1:
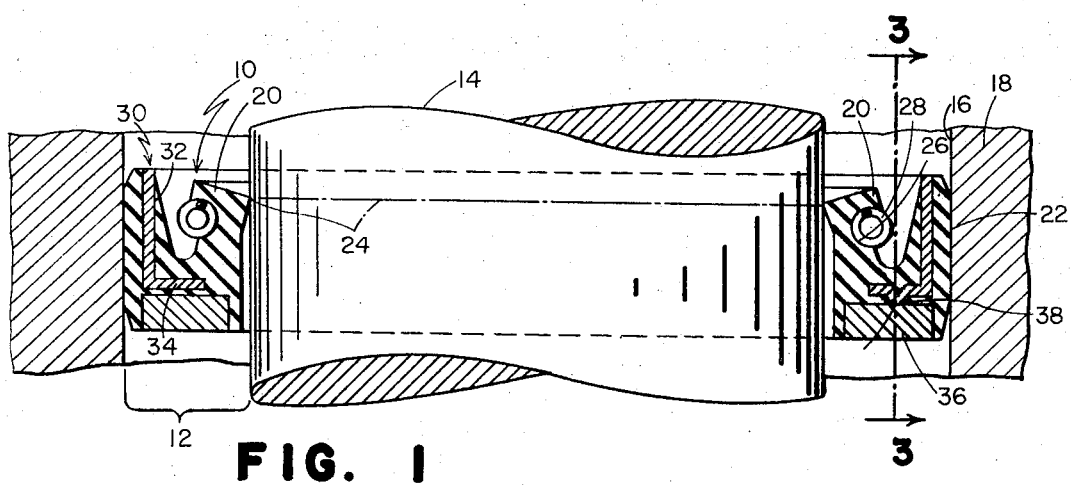
FIG. 1 is a radial section of a seal constructed according to the present invention.

Referring to the drawing, the seal 10 is disposed in the annular gap 12 between a shaft 14 and a bore 16 provided in a member 18. The seal 10 comprises an elastomeric body 20 having a generally flat radially outermost surface 22 for engagement with the bore 16 and an angled radially innermost corner 24 for contacting the shaft 14. A recess 26 is provided in the body 20 radially outwardly from the corner 24 and is suitably shaped to receive a garter spring 28. A first metallic reinforcing member 30 is disposed within the elastomeric body 20 and comprises a cylindrical first portion 32 having an axis which coincides with the axis of the bore 16 and integral radial second portion 34. A second metallic reinforcing member 36 is partially enclosed by the elastomeric body 20 and includes the radially disposed planar upper surface 38, which faces the reinforcing member portion 34.

Figure 2:
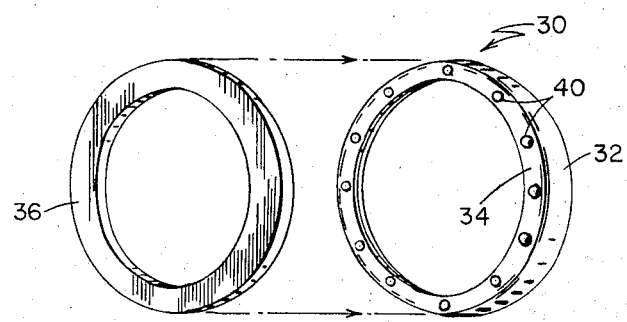
FIG. 2 is an exploded isometric view of the two rigid members of the seal of FIG. 1.
Figure 3:
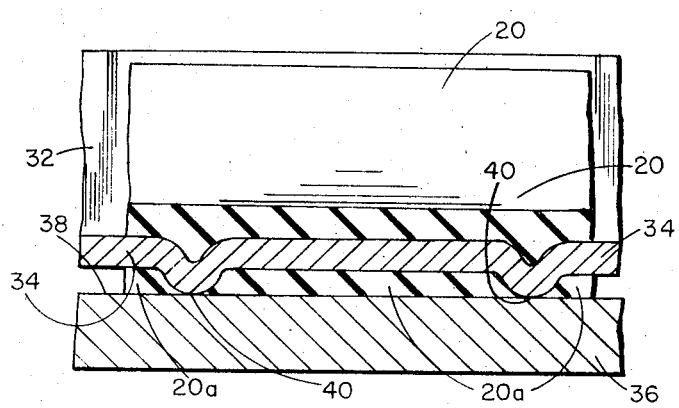
FIG. 3 is a partial projected section taken at 3-3 of FIG. 1.

According to the invention, and as best seen in FIGS. 2 and 3, the radial portion 34 and the surface 38 contact each other at a plurality of spaced apart locations in the form of discrete arcuately spaced projections 40 from the surface of portion 34 around the circumference of a reference circle on the surface 38. Portions 20a of the integral elastomeric body 20 fill the apertures between the surface 38 and the projections 40 intermediate those projections.

In operation, the corner 24 under the influence of the garter spring 28, as is well known, seals against the shaft 14. The cylindrical portion 32 of the reinforcing member 30 extends adjacent and parallel to the surface 22 of the elastomeric body and assists in providing a leak-proof engagement of surface 22 with the bore 16. The second portion 34 of the member 30 helps prevent excessive axial deformation of the elastomeric body 20.

The member 36, which may simply be a heavy gauge washer, provides support to resist pressure exerted on the seal by the fluid medium.

In typical prior constructions, a separate back-up member (analogous to member 36) had to be inserted into the annular gap 12 prior to the placement of the seal 10. The present unitary construction simplifies shipping, storage, and assembly difficulties inherent in the prior devices.

The relation of portion 34 to surface 38, whereby they contact each other only at spaced apart locations defined by projections 40, assures the flow elastomeric material which forms the body 20 during the molding process through the spaces which occur between those locations. This feature thus provides for the convenient manufacture of the seal 10 as a unitary device which will maintain the proper internal relationship of its component parts even when subjected to high pressures. The projections 40 may not only be provided by projections from the lower edge of 34 as is shown in FIGS. 2 and 3, but alternatively, other forms of spaced "upsets" may be provided in that lower edge of portion 34, the "upsets" producing between them the gaps through which the elastomeric material can flow.

While a particular preferred embodiment has been illustrated and described in detail, other embodiments are within the scope of the invention in the following claims.

I claim:

1. A radial seal for shaft-to-bore sealing against a high pressure fluid medium comprising an integral annular body formed from an elastomeric material having a maximum radial dimension at least as great as the shaft-to-bore gap; a first rigid reinforcing member comprising a generally axial first portion at least partially enclosed by said body and an integral second portion enclosed by said body and projecting radially inwardly from said first portion; and a second rigid reinforcing member at least partially enclosed by said body and including an annular surface facing said first reinforcing member second portion, said first reinforcing member second portion contacting said surface at a plurality of spaced apart locations thereby providing spaces therebetween which are filled with said elastomeric material.

2. The radial seal of claim 1 wherein said locations are symmetrically disposed upon a reference circle on said surface.

3. The radial seal of claim 2 wherein said first portion of said first reinforcing member is cylindrical and said second portion is integral therewith extending radially at one end thereof, with a plurality of arcuately spaced projections thereon.

* * * * *